United States Patent
Jepsen et al.

(10) Patent No.: US 9,359,142 B2
(45) Date of Patent: Jun. 7, 2016

(54) HYGIENIC DRUM MOTOR

(71) Applicant: P. Ellegaard A/S, Viborg (DK)

(72) Inventors: Erik Lund Jepsen, Værløse (DK); Jais Ask Hansen, Jægerspris (DK)

(73) Assignee: P. Ellegaard A/S, Viborg (DK)

( * ) Notice: Subject to any disclaimer, the term of this patent is extended or adjusted under 35 U.S.C. 154(b) by 0 days.

(21) Appl. No.: 14/386,050

(22) PCT Filed: Apr. 2, 2013

(86) PCT No.: PCT/DK2013/050093
§ 371 (c)(1),
(2) Date: Sep. 18, 2014

(87) PCT Pub. No.: WO2013/143550
PCT Pub. Date: Oct. 3, 2013

(65) Prior Publication Data
US 2015/0068874 A1 Mar. 12, 2015

(30) Foreign Application Priority Data

Mar. 20, 2012 (DK) .................................. 2012 70164
Mar. 20, 2012 (DK) .................................. 2012 70165

(51) Int. Cl.
*B65G 13/06* (2006.01)
*B65G 23/08* (2006.01)

(52) U.S. Cl.
CPC ........................................ *B65G 23/08* (2013.01)

(58) Field of Classification Search
CPC ......... B65G 23/08; B65G 13/06; B65G 13/02

USPC .................................................... 198/788, 789
See application file for complete search history.

(56) References Cited

U.S. PATENT DOCUMENTS 4,792,037 A * 12/1988 Huber .................. B65G 13/065
 198/782
5,088,596 A * 2/1992 Agnoff ................. B65G 13/073
 198/788

(Continued)

FOREIGN PATENT DOCUMENTS

DE 19618248 C1 10/1997
EP 0174682 A1 3/1986

(Continued)

OTHER PUBLICATIONS

International Search Report and Written Opinion for PCT/DK2013/050093, dated Aug. 29, 2013.

*Primary Examiner* — James R Bidwell
(74) *Attorney, Agent, or Firm* — Dinsmore & Shohl LLP; Weston R. Gould

(57) ABSTRACT

A drum motor optimized for the hygienic requirements in the food industry; in particular the drum motor is used for driving conveyor belts. One embodiment of the invention discloses a drum motor comprising a drum shell accommodating a geared rim secured to the drum shell, a first inner end cap attached to the geared rim, a second inner end cap attached to a locking flange having an expanding element adapted to secure the second inner end cap to the drum shell when attaching the second inner end cap to the locking flange.

16 Claims, 15 Drawing Sheets

(56) References Cited

U.S. PATENT DOCUMENTS

| | | |
|---|---|---|
| 6,263,779 B1 | 7/2001 | Oliver et al. |
| 6,612,422 B2 * | 9/2003 | Roberts .................. B65G 23/08 198/788 |
| 7,207,433 B2 * | 4/2007 | Schaefer ................ B65G 23/08 198/788 |
| 7,618,352 B1 | 11/2009 | Wei |
| 8,348,813 B2 * | 1/2013 | Huang ............... A63B 22/0235 198/788 |
| 8,789,686 B2 * | 7/2014 | Lindemann ............ B65G 23/08 198/788 |
| 2011/0062000 A1 | 3/2011 | Yamamoto |

FOREIGN PATENT DOCUMENTS

| | | |
|---|---|---|
| EP | 1493692 A1 | 1/2005 |
| EP | 2088100 A1 | 8/2009 |
| GB | 2333274 A | 7/1999 |
| WO | 9407656 A1 | 4/1994 |

\* cited by examiner

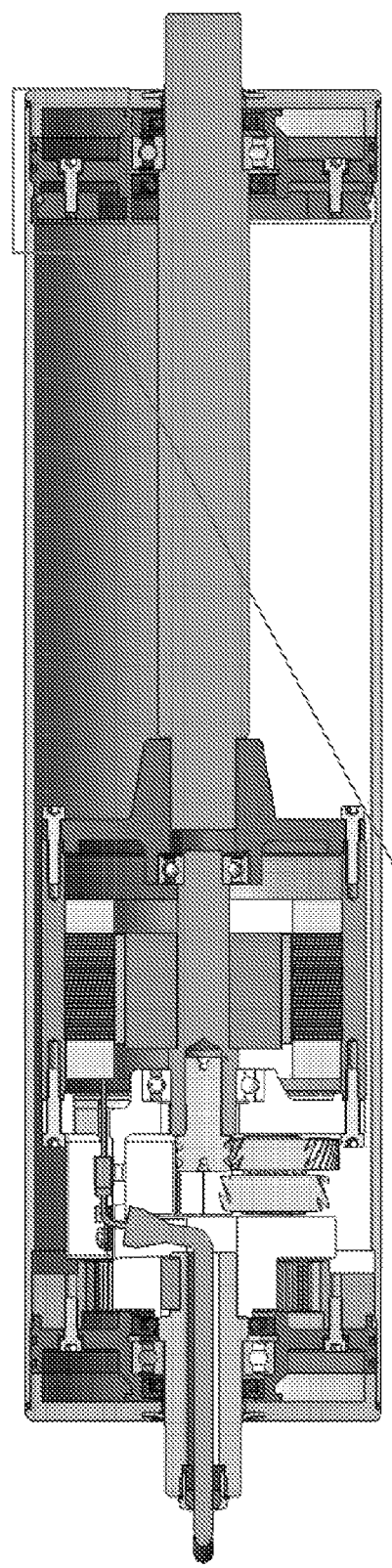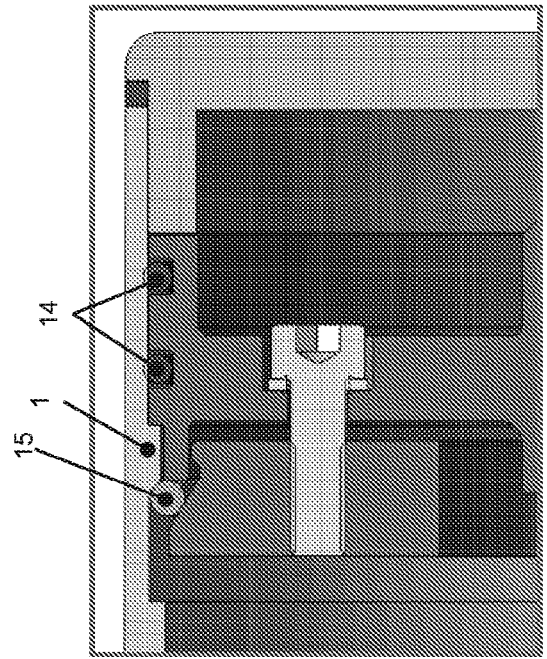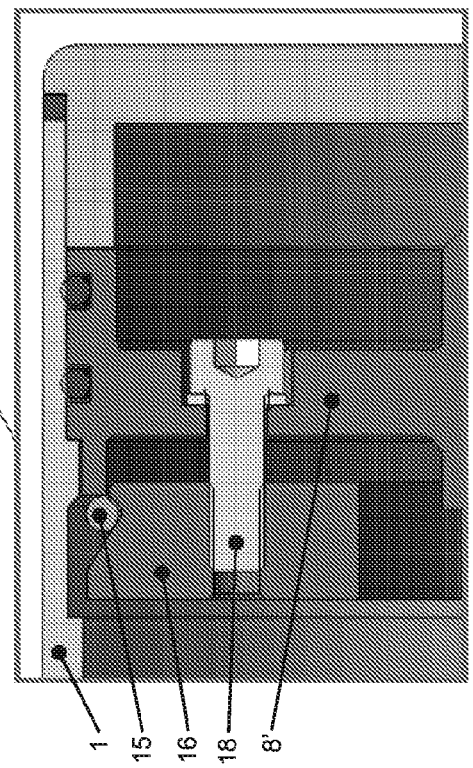
Fig. 2a
Fig. 2b
Fig. 2c

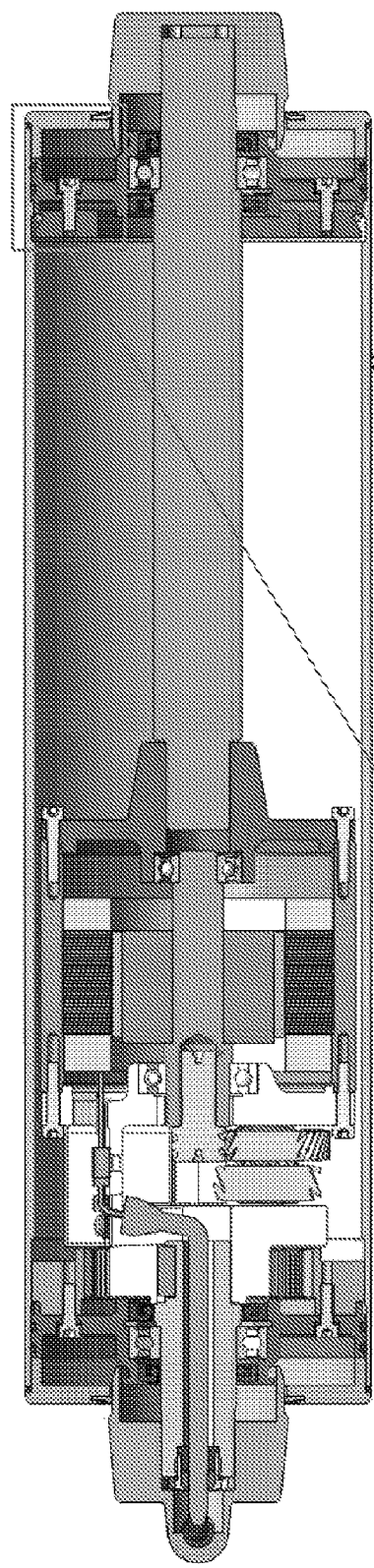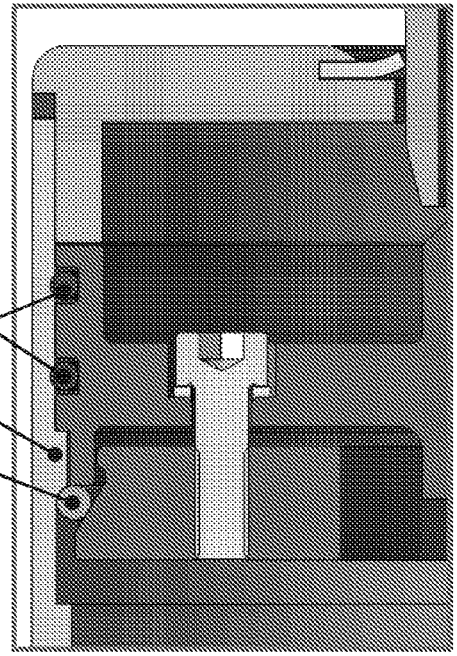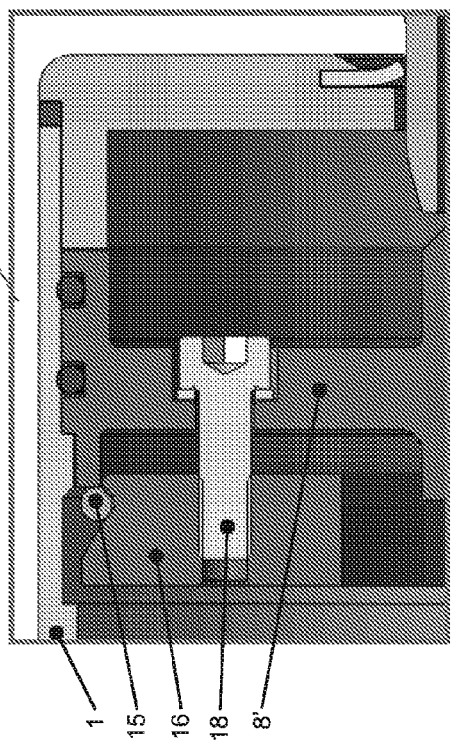

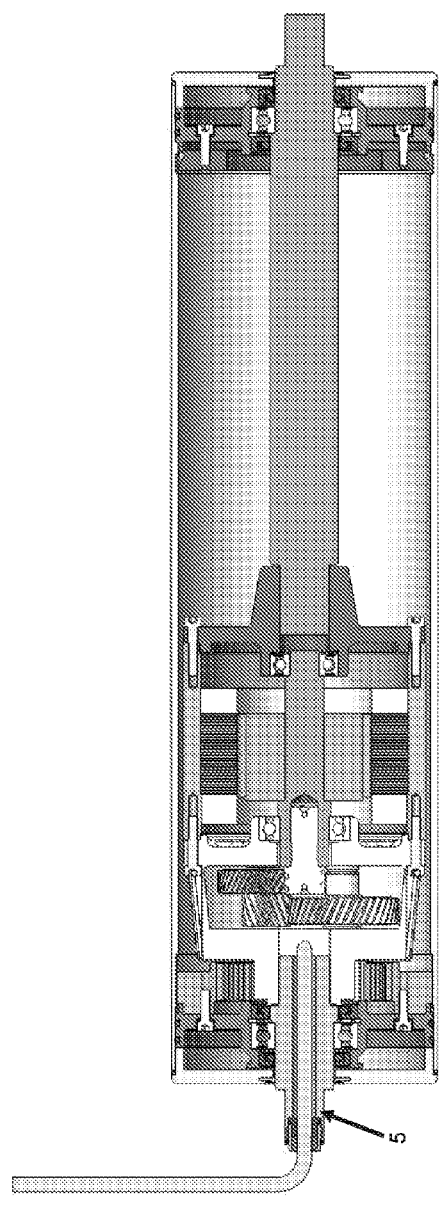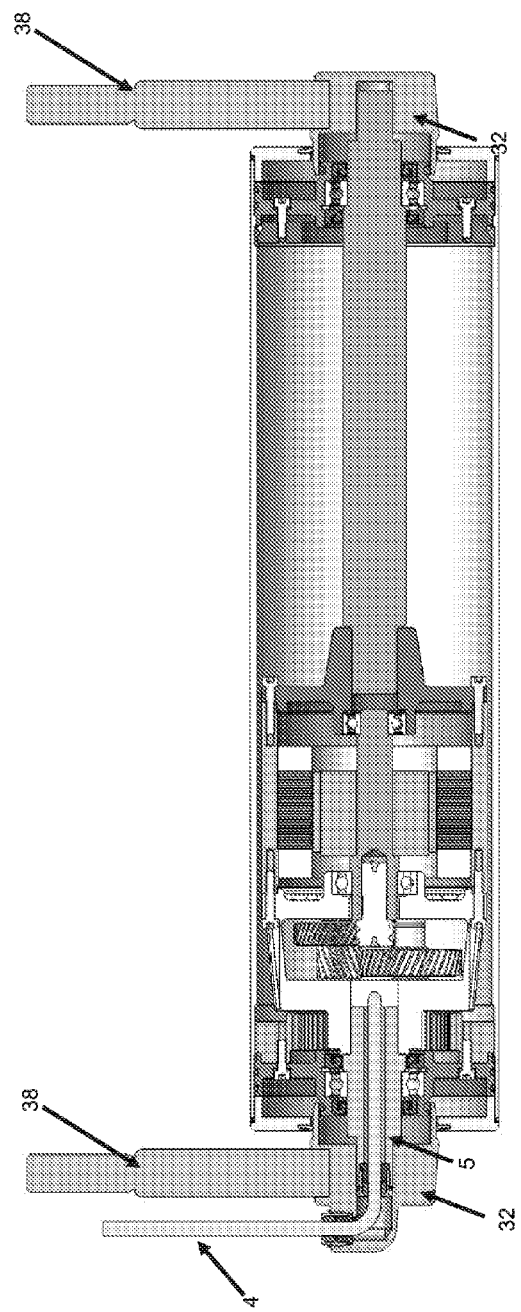

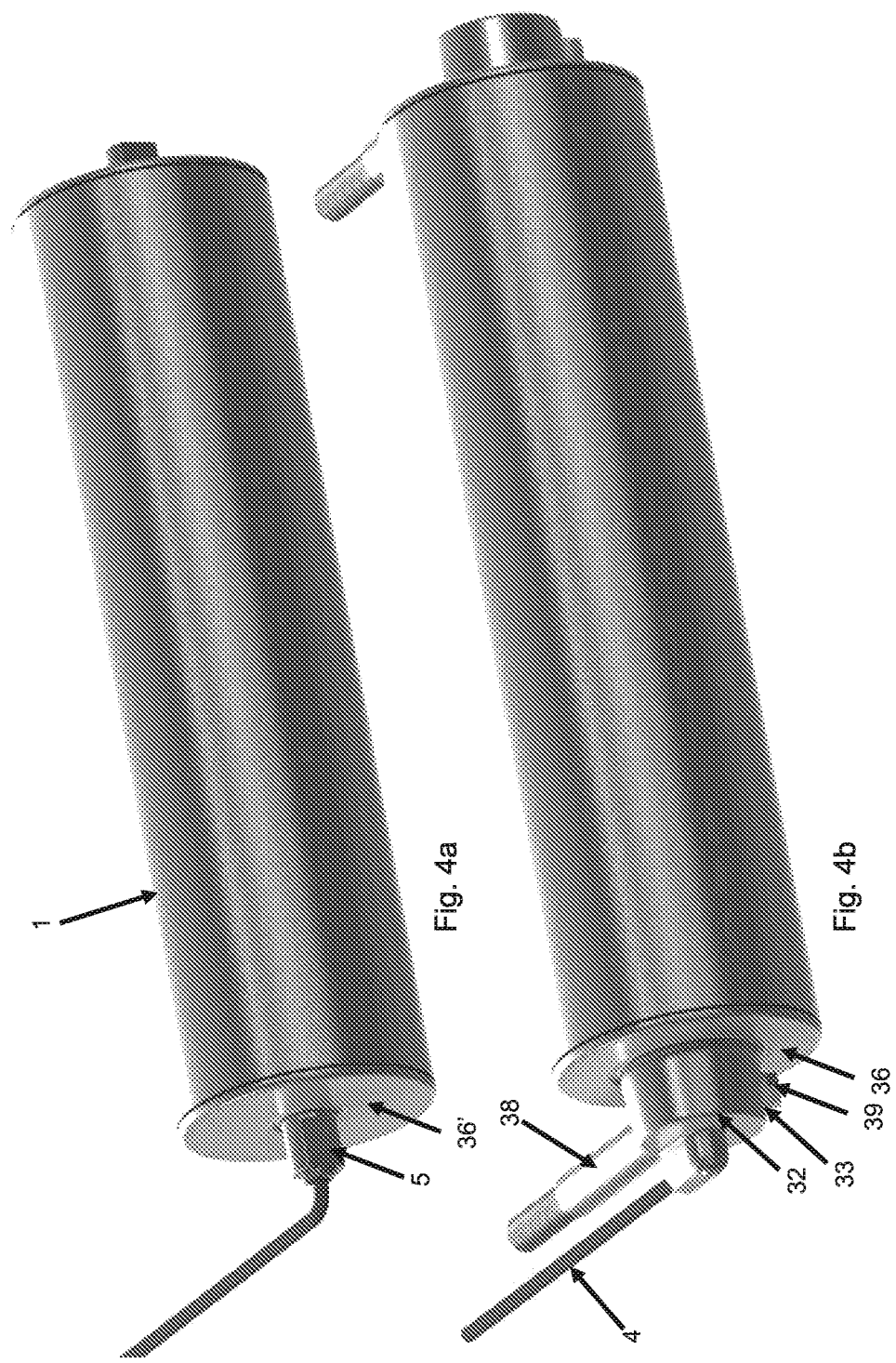

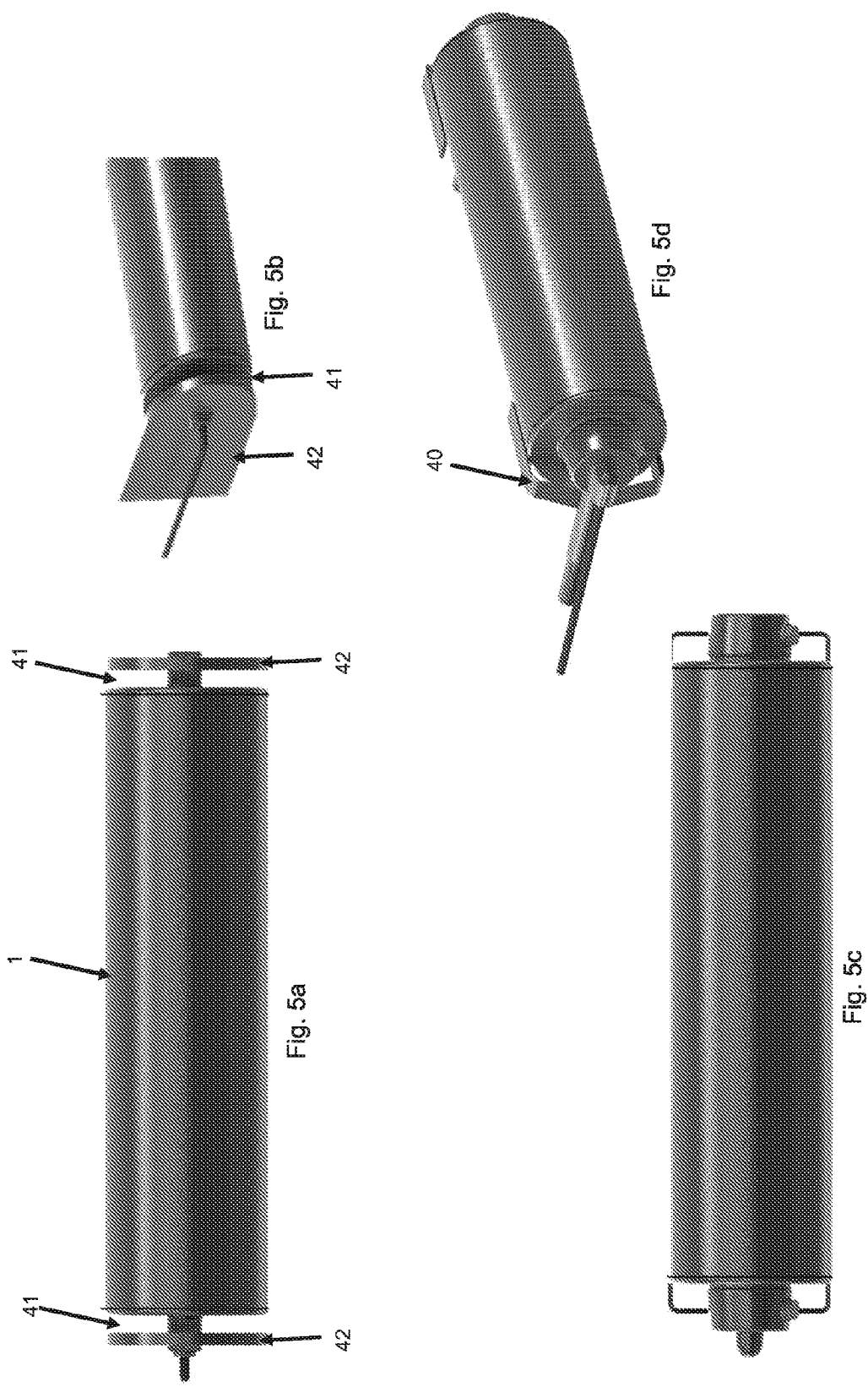

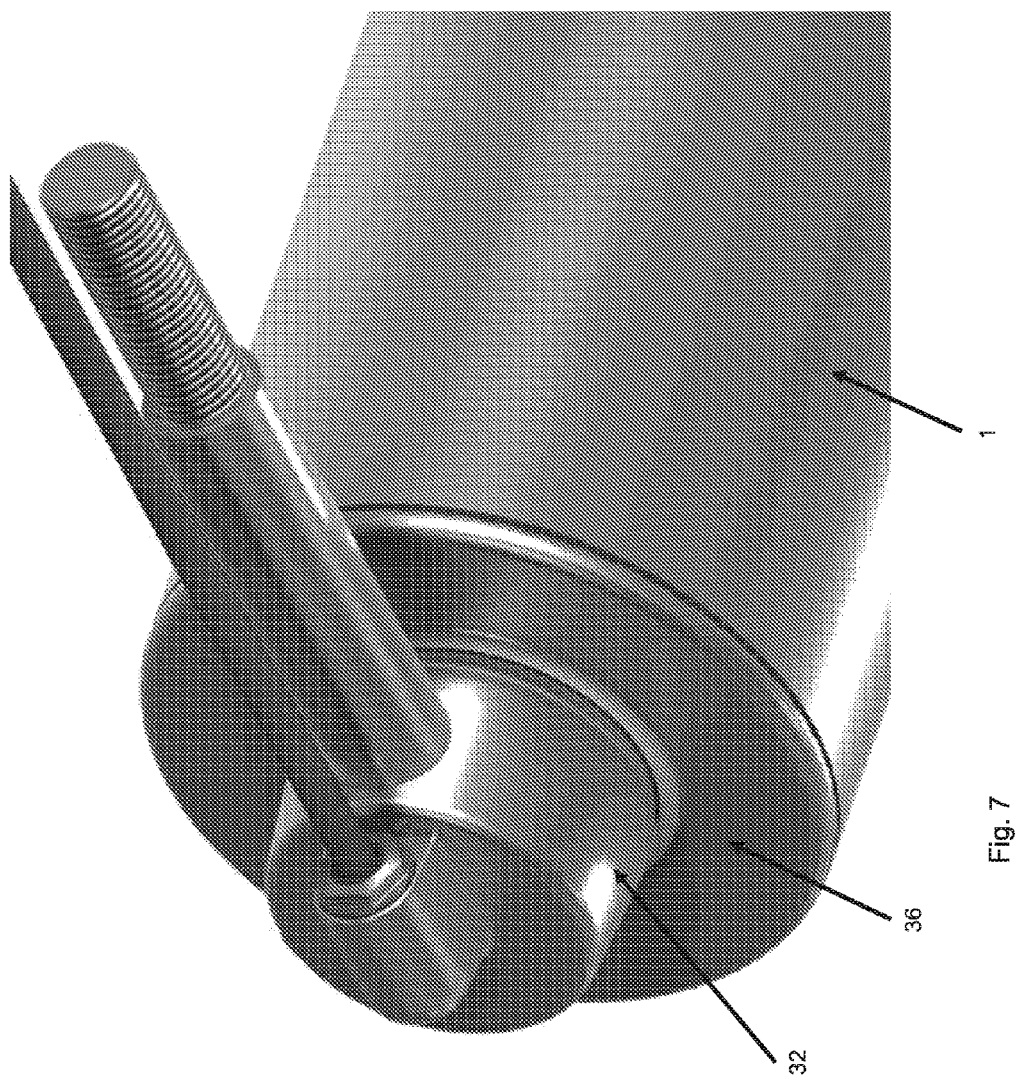

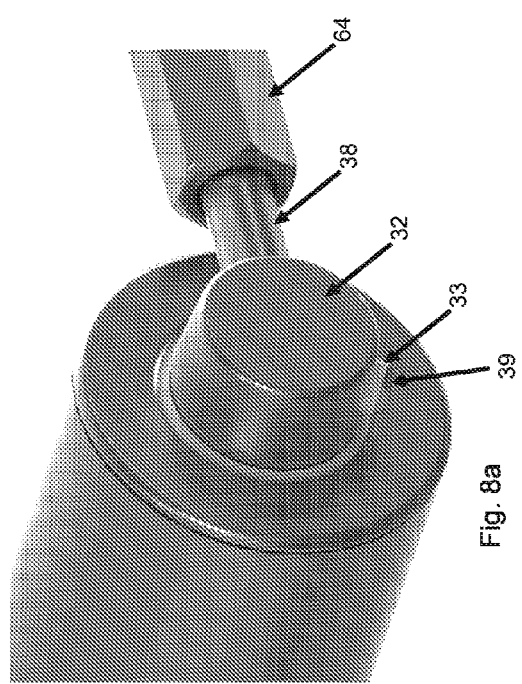
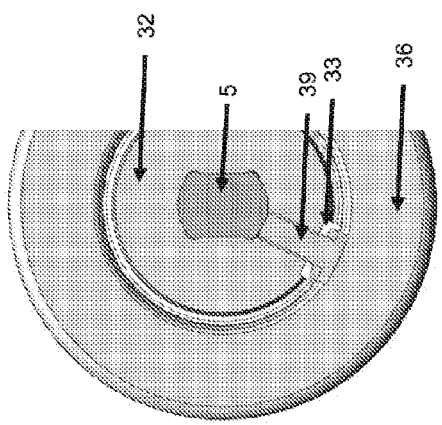

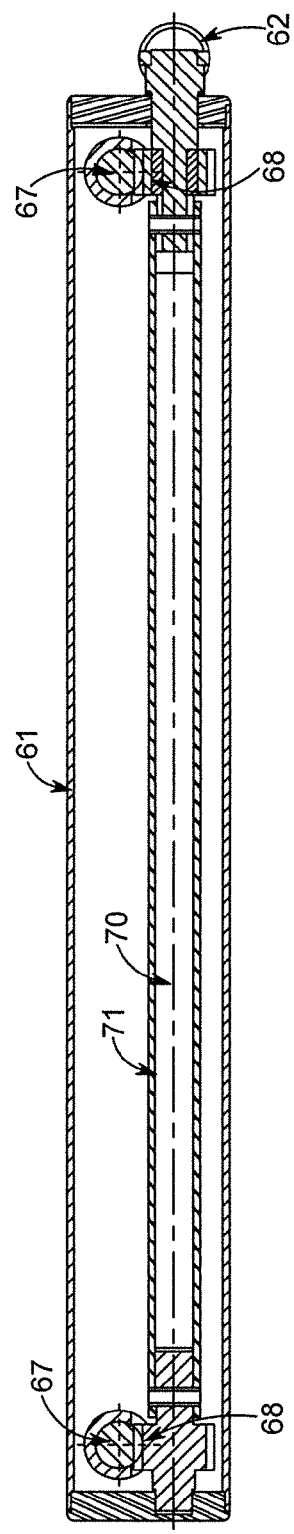
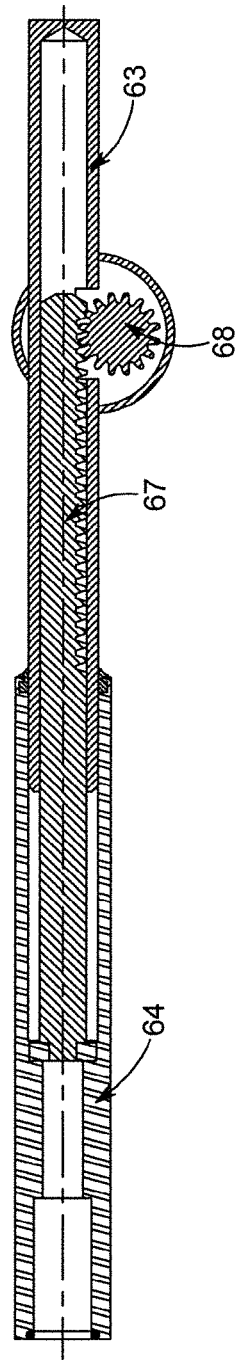
FIG.11A
FIG.11B

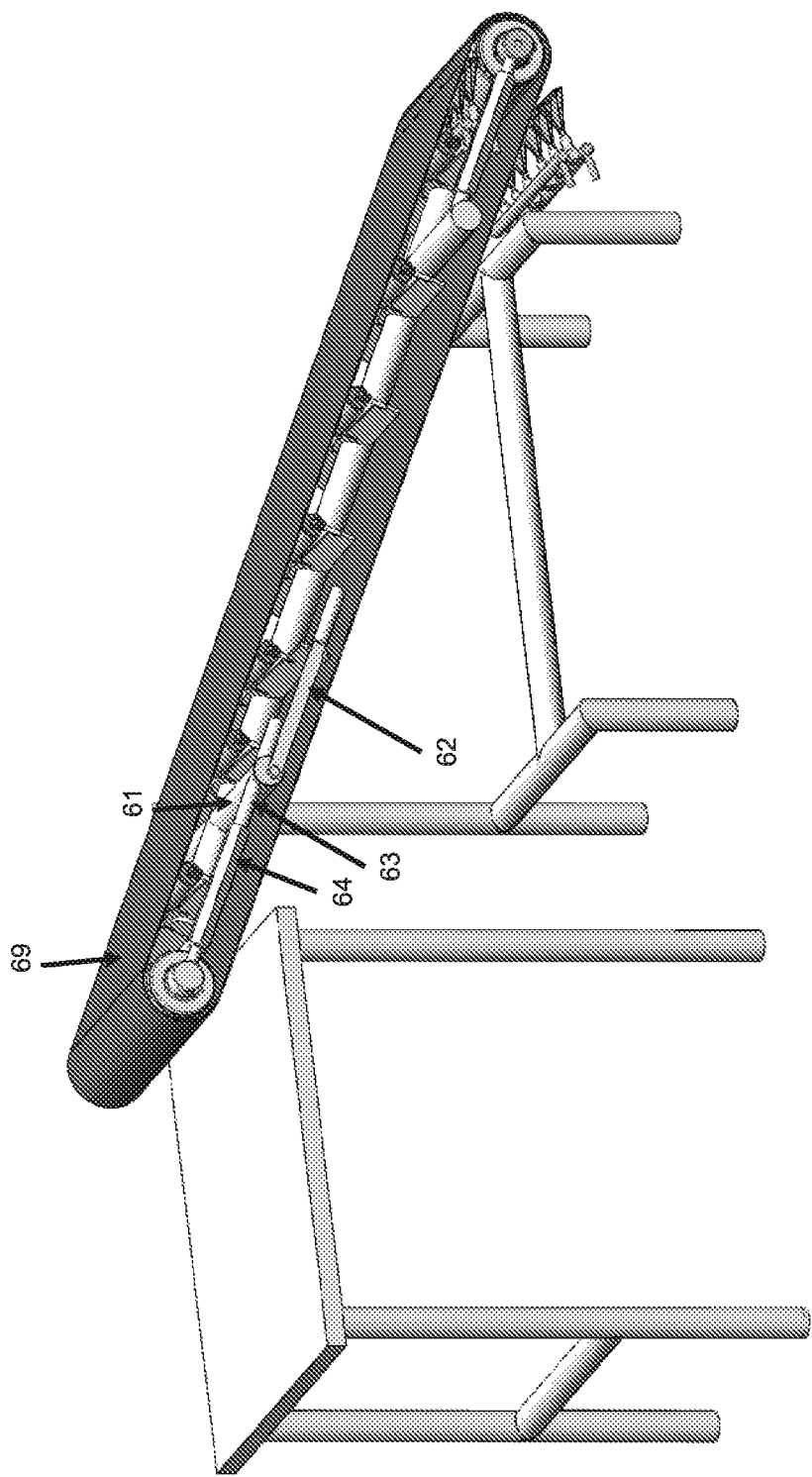

HYGIENIC DRUM MOTOR

CROSS-REFERENCE TO RELATED APPLICATIONS

This application is the U.S. National Phase of PCT/DK2013/050093 filed Apr. 2, 2013, which claims priority of Danish Paten Applications PA 2012 70164 and PA 2012 70165, both filed Mar. 30, 2012.

The invention relates to a drum motor optimized for the hygienic requirements in the food industry; in particular the drum motor is used for driving conveyor belts. The present disclosure further relates to a quick release system for a conveyor belt system.

BACKGROUND OF INVENTION

A drum motor (sometimes referred to as a motorised pulley) is a geared motor drive enclosed within a tubular shell (the drum shell or the drum tube) providing a single component driving pulley for conveyor belts. A drum motor typically comprises a motor (e.g. electric or hydraulic) fixed to a stationary shaft at one end of the drum and directly coupled through the motor's rotor pinion to an in-line gearbox which is fixed to the other stationary shaft. The torque is transferred from the motor via the gearbox to the drum shell through a coupling or geared rim attached to the shell or end housing. The only moving external parts are the drum shell and bearing housings. The power required by the motor is provided through one of the stationary shafts. The exposed drum shafts are used to install and fix the drum motor into the conveyor frame and do not rotate. Lubrication of the drum motor is achieved with oil and/or grease whereby the oil may also help to cool the motor. Each end of the drum shell is sealed with some sort of lid to keep the oil in the interior of the drum tube and to prevent water, dust and dirt to reach the inside of the drum motor.

SUMMARY OF INVENTION

The end sealing is all the more required when drum motors are used in the food or pharmaceutical industry. Prevention of oil leakage from the inside is off course a necessity, but the drum motor must also be able to withstand hygienic cleaning involving e.g. high pressure water, steam or chemicals. Complete sealing may be provided if all parts are allowed to be permanently sealed. However, even though service intervals can be very long for a drum motor, service and thereby access to the inner parts of the drum motor is required from time to time. Furthermore, to ensure a high degree of hygiene smooth outer surfaces minimizing holes, grooves, gaps and projections are preferred. Design of a drum motor for hygienic environments is therefore a balancing between the sealing requirements, the ability to disassemble the drum motor for service checks and the need for hygienic smooth outer surfaces.

One purpose of the invention is therefore to address these partly conflicting requirements. One embodiment of the invention therefore discloses a drum motor comprising a drum shell accommodating a geared rim secured to the drum shell, a first inner end cap attached to the geared rim, a second inner end cap attached to a locking flange having an expanding element adapted to secure the second inner end cap to the drum shell when attaching the second inner end cap to the locking flange.

This first embodiment of the present invention addresses the problem of securing the end caps. The geared rim is secured to the drum shell and transfers the torque from the motor to the drum shell. Thus, one of the inner end caps can be directly attached to the geared rim, preferably the first inner end cap is only attached to the geared rim, whereby the torque transfer may be isolated to the geared rim, i.e. the first inner end cap does not transfer torque to the drum shell.

In the opposite end of the drum motor the second inner end cap must also be attached to the drum shell. A clever attachment of the second inner end cap is provided by having a locking flange inside the drum shell. The locking flange is provided with an expanding element, preferably a radially expanding element. When the second inner end cap is attached and tightened to the locking flange the expanding element is adapted to expand radially towards the drum shell, thereby securing the second inner end cap to the drum shell.

Even though the drum motor itself may be totally sealed and provided with a smooth clean stainless steel profile without any protrusions, the integration and assembly into a conveyor belt system, i.e. attachment of the stationary shafts into a conveyor frame, will inevitably introduce trenches and openings that are difficult to access and clean. A further embodiment of the invention addresses this problem by disclosing a drum motor comprising a drum shell and first and second stationary shafts traversing each end of the drum shell, the drum shell accommodating a geared rim secured to the drum shell, a first inner end cap attached to the geared rim, a second inner end cap secured against the drum shell, support cups attached to the stationary shafts and outer end caps attached to the inner end caps or the drum shell and sealing against the support cups. By having support cups attached to the stationary shafts the incorporation of the drum motor into a conveyor belt system may be integrated into the drum motor.

A further aspect of the invention relates to the accessibility to the drum motor after incorporation into a conveyor belt system and the ability to clean the drum motor and the corresponding conveyor belt. A further embodiment of the invention therefore discloses a quick release system for an endless belt conveyor system comprising an elongated release handle in rotatable engagement with a pivot axis incorporated in a pivot tube, each end of the pivot tube attached to a linear actuator extending perpendicular to the pivot tube, wherein the tube is adapted to be attached to a conveyor frame such that the pivot tube extends across the conveyor belt, the linear actuators are adapted to be attached to a conveyor roll such that the rotation axis of the conveyor roll and the pivot axis are parallel, and the quick release system is configured such that rotation of the elongated release handle around the pivot axis engages the linear actuators. The quick release system can be integrated as an add-on component to a standard conveyor frame. The rotatable release handle enables manual and safe linear displacement of the drum motor (or passive conveyor roll) within seconds, whereby the conveyor belt can be slacked for cleaning or service purposes.

DESCRIPTION OF DRAWINGS

The invention will now be described in further detail with reference to the drawings in which FIG. 2a-c shows cross-sectional close-ups of the expanding element and the inner end cap attachment for a drum motor according to one embodiment of the invention, FIG. 2d-f shows cross-sectional close-ups of the expanding element and the inner end cap attachment for a drum motor with hygienic support cups according to another embodiment of the invention, FIGS. 3-6 show comparisons of a traditional end cap drum motor design and a drum motor with support cups, FIGS. 7-8 show close-up illustrations of a support cup with a support interface, FIG. 13 is an illustration of a conveyor system with the quick release system.

DETAILED DESCRIPTION OF DRAWINGS

Figure 1:
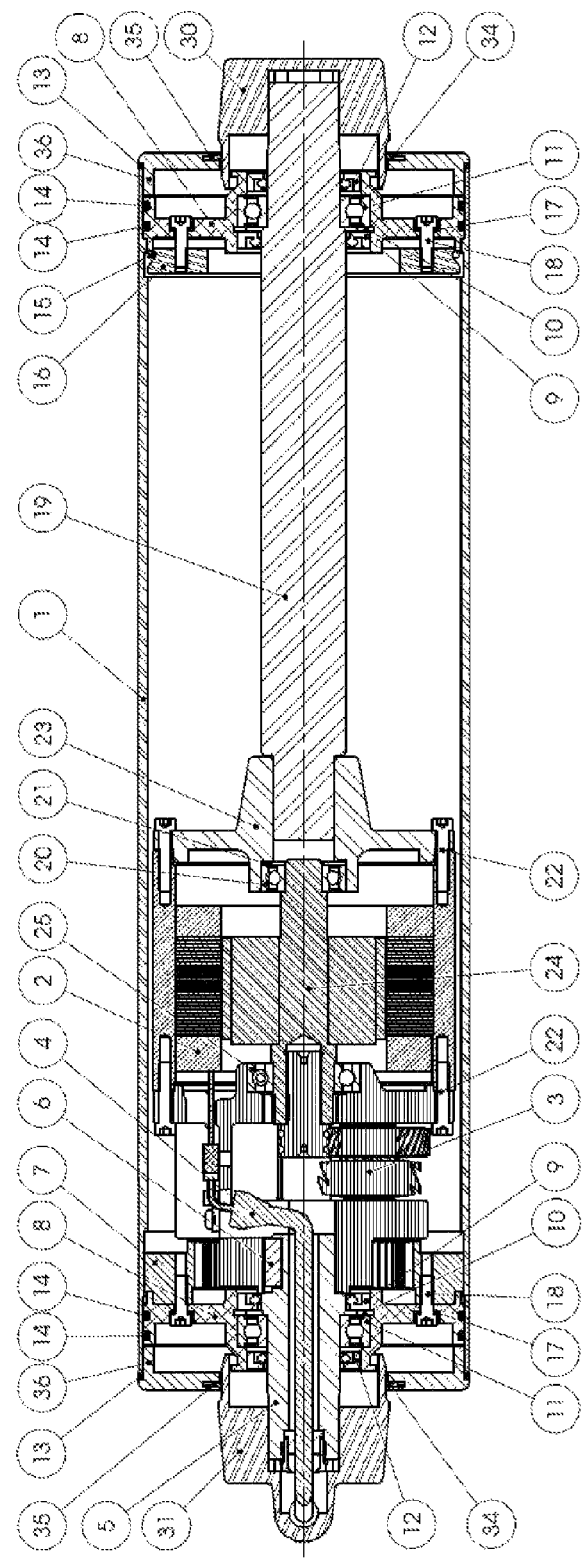
FIG. 1 shows a cross sectional illustration of a drum motor according to one embodiment of the invention.

In one embodiment of the invention the drum motor comprises first and second stationary shafts 5, 19 traversing each end of the drum shell 1. The stationary shafts 5, 19 are preferably located in line along a longitudinal central axis of the drum shell 1 and wherein the drum shell 1 is adapted to rotate around said stationary shafts 5, 19. A motor is preferably secured to at least one of the stationary shafts 5, 19. A gear 3 is preferably provided to engage the motor and the geared rim 7. The geared rim 7 is secured to the drum shell 1, preferably permanently secured. The geared rim 7 is preferably adapted to transfer the torque from the motor to the drum shell 1.

In one embodiment of the invention the second inner end cap 8' is detachably mounted on the locking flange 16, preferably axially mounted. An example of such an attachment is shown in FIG. 2 with most of the drum motor in FIG. 2a, the second inner end cap 8' just inserted in FIG. 2b and the second inner end cap 8' secured to the drum shell 1 via the expanding element 15 in FIG. 2c. The second inner end cap 8' is preferably detachably mounted on the locking flange 16 by means of a plurality of axially mounted attachment means, such as bolts 18, provided with seals, such as static oil seals, such as Usit rings.

In one embodiment of the invention the second inner end cap 8' and the locking flange 16 can be loosely preassembled outside the drum motor without activating the expanding element 15 and inserted into the drum motor as essentially one unit. Correspondingly when the drum motor needs to be disassembled for service the inner end cap 8' is slightly loosened from the locking flange 16 thereby releasing the expanding element 15, where upon the inner end cap 8' and the locking flange 16 can be removed axially from the drum motor.

The locking flange 16 may thus be adapted to be displaced axially towards the second inner end cap 8', when the second inner end cap 8' is being tightened to the locking flange 16. Correspondingly the expanding element 15 may be adapted to expand radially towards the drum shell 1 when the second inner end cap 8' is being tightened to the locking flange 16. The locking flange 16 may comprise a tapered part for accommodating the expanding element 15. The expanding element 15 may be a spring ring or snap ring 15. I.e. in one embodiment of the invention the tightening of the second inner end cap 8' draws the locking flange 16 against the second inner end cap 8'. A spring ring 15 is placed on a tapered/conical part of the locking flange 16 and during the axial displacement the spring ring 15 slides up the conical part thereby expanding towards the drum shell 1 and finally securing the second inner end cap 8' and the locking flange 16 to the drum shell 1.

O-rings 14 may be provided to seal the inner end cap 8' towards the drum shell 1. From FIG. 2 it is seen that the expanding element 15 can be kept in place on the locking flange 16 between the conical part and a small projection of the flange 16. Correspondingly when the inner end cap 8' is tightened against the locking flange 16 the expanding element 15 may be caught against a conical projection on the inside of the drum shell 1. The expanding element 15 ensures that the inner end cap 8' and the locking flange 16 is secured radially against the drum shell 1, however the actual mounting of the inner end cap 8' is provided by the axially mounted attachment means 18. Thereby the inside of the drum motor is sealed by the inner end cap 8', however with this type of mounting and attachment the drum motor is easy to disassemble, e.g. for service requirements.

In a further embodiment of the invention the first inner end cap 8 is detachably mounted on the geared rim 7, preferably axially mounted. The first inner end cap 8 may be detachably mounted on the geared rim 7 by means of a plurality of axially mounted attachment means 18, such as bolts, provided with seals, such as static oil seals, such as Usit rings. In one embodiment of the invention the first inner end cap 8 is only attached to the geared rim 7. However, preferably the inner end caps 8, 8' are sealed against the drum shell 1, e.g. by means of O-rings 14.

The inner end caps may provide the functionalities of 1) solid integration into the interior of the drum motor, by attaching to the geared rim in one side and to the drum shell via the locking flange in the opposite side, 2) sealing against the drum shell, and 3) sealing the outside of the drum motor such that dust, dirt, etc. does not enter the drum shell. However, a two part solution may be provided where outer end caps provide the outside sealing. Thus, in a further embodiment of the invention, outer end caps 36' are attached to the ends of the drum shell 1 for covering and sealing the interior of the drum. Typically outer end caps of drum motors are attached to the drum motor and secured with e.g. Loctite and/or external screws or bolts to provide for sufficient sealing and attachment because often the outer end caps are adapted to transfer some of the torque from the motor to the drum shell. Once secured with Loctite it is almost impossible to disassemble the end caps again and external bolts introduce projections, gaps and grooves on the outer surface of the drum motor making it very difficult to clean properly.

Outer end caps 36' can be seen in FIGS. 4 and 5. The outer end caps 36' are preferably detachably mounted on the inner end caps 8, 8' or on the drum shell 1. The outer end caps 36' may be detachably press fitted and/or snap fitted into the inner end caps or the drum shell, thereby providing for a smooth outer surface. Furthermore, the outer end caps 36' may be provided with a rotary lip seal for sealing against the stationary shafts 5, 19. The inside of the drum motor is sealed and secured by the inner end caps 8, 8'. The outer end caps provide the ends of the drum motor with an additional seal and smooth hygienic surfaces without any fastening or attaching components, grooves or gaps, where dirt can assemble. At the same time the outer end caps 36' can be easily removed providing access to the inner end caps 8, 8' that can be easily disassembled as described above.

Figure 6:
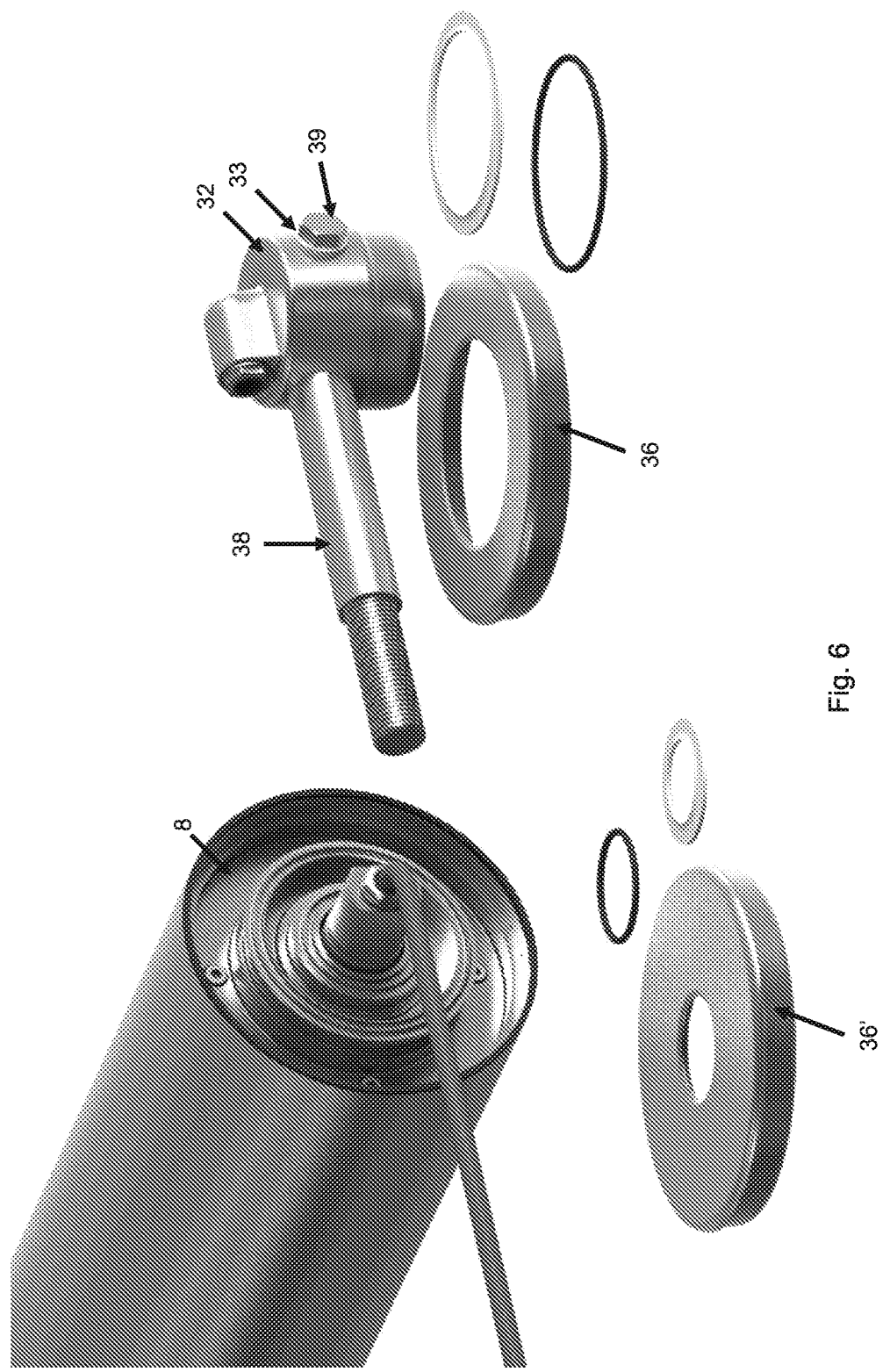

As stated previously support cups may be attached to the stationary shafts with outer end caps sealing against the support cups, e.g. by means of a rotary lip seal. FIGS. 2-6 illustrate the difference between a drum motor with the traditional end caps and a drum motor provided with support cups. The support cups 32 may be hygienically attached to the stationary shafts 5, 19 by means of a fastener, such as a bolt with a seal, such as a radially positioned bolt 39 with a sealing washer 33 as seen in FIGS. 4b, 6 and 8. The support cups 32 may be adapted for direct integration with a conveyor frame.

Thus, the conveyor frame is literally extended into the drum motor thereby becoming part of the drum motor. E.g. each support cup 32 may comprise a support interface 38, such as a support interface 38 for attachment to a conveyor frame. The support cups 32 may be adapted for fitting or snap fitting of the drum motor directly into a conveyor frame. Further, the support cups 32 and/or the support interfaces 38 may be adapted for direct attachment to a belt tensioning mechanism on a conveyor frame. In a further embodiment a safety shield 40 is attached to the support cups 32 and/or the support interface 38, the safety shield is preferably adapted to at least partly cover the gaps between the conveyor belt and the drum shell.

Cross-sectional views are provided in FIG. 3 with the traditional end cap design shown in FIG. 3*a*. In FIG. 3*b* it can be seen that the support cup 32 is attached to the shaft 5 and extends into the drum motor with a rotary seal against the outer end caps 36. Outside views are provided in FIG. 4 with the traditional design in FIG. 4*a* and with the support cups 32 in FIG. 4*b*. The hygienic advantage of the support cups 32 is visible in FIGS. 5*a* and 5*b* where a drum motor with the traditional end cap design is mounted in a conveyor frame 42. Dust, dirt, bacteria, food scrap, etc. may collect in the gap 41 between the drum motor and the conveyor frame 42 and the width and depth of the gap makes it very difficult to clean. A drum motor with support cups 42 as shown in FIGS. 4*b*, 5*c* and 5*d* does not have any gaps or holes which are difficult to clean. As a further safety precaution the drum motor may be provided with a safety shield 40 attached to the support cups and/or the support interface. The safety shield is primarily provided to prevent fingers from getting caught between the rotating drum shell 1 and a corresponding conveyor belt. As seen from the figures a part of the support interface 38 may be threaded for direct integration with e.g. a belt tensioning mechanism on a conveyor frame.

In FIG. 6 disassembled versions of the traditional end cap 36' design and the support cup 32 with support interface 38, mounting bolt 39 and outer end cap 36, is shown. Inside the drum motor the inner end cap 8 is visible. The support cups 32 are preferably adapted such that the axial position of the support cups 32 relative to the stationary shafts 5, 19 may be adjusted. The distance between the support cups can thereby be adjusted to better fit into a specific conveyor frame. From FIG. 6 it can be seen that the support cup 32 allows for certain variation of the axial position of the support cup 32 on the stationary shaft. In one embodiment the support cups 32 may be adjusted approx. 5 mm axially in each side of the drum motor without sacrificing any sealing properties, allowing for a total of approx. 10 mm variation of the width of the drum motor, e.g. to match a corresponding conveyor frame.

FIG. 7 shows a close-up illustration of the support cup 32. In FIG. 8*a* drum motor is mounted on a conveyor frame via the threaded support interface 38 attached to a belt tensioning mechanism 64. FIG. 8*b* shows a cross-sectional illustration of the end of the drum motor with the radial positioned mounting bolt 39. The mounting bolt 39 extends radially through the support cup 32 and secure the support cup 32 on the shaft 5. The sealing washer 33 provides a liquid tight seal of this connection.

Quick Release System

As previously stated the present disclosure further relates to a quick release system for an endless belt conveyor system. An embodiment of the quick release system 60 is shown in FIGS. 9-14. The quick release system 60 comprises an elongated release handle 62 in rotatable engagement with a pivot axis 70 incorporated in a pivot tube 61, each end of the pivot tube 61 attached to a linear actuator extending perpendicular to the pivot tube 61, wherein the pivot tube 61 is adapted to be attached to a conveyor frame such that the pivot tube 61 extends across the conveyor belt 69, the linear actuators are adapted to be attached to a conveyor roll such that the rotation axis of the conveyor roll and the pivot axis 70 are parallel, and the quick release system 60 is configured such that rotation of the elongated release handle 61 around the pivot axis 70 engages the linear actuators.

Figure 9A:
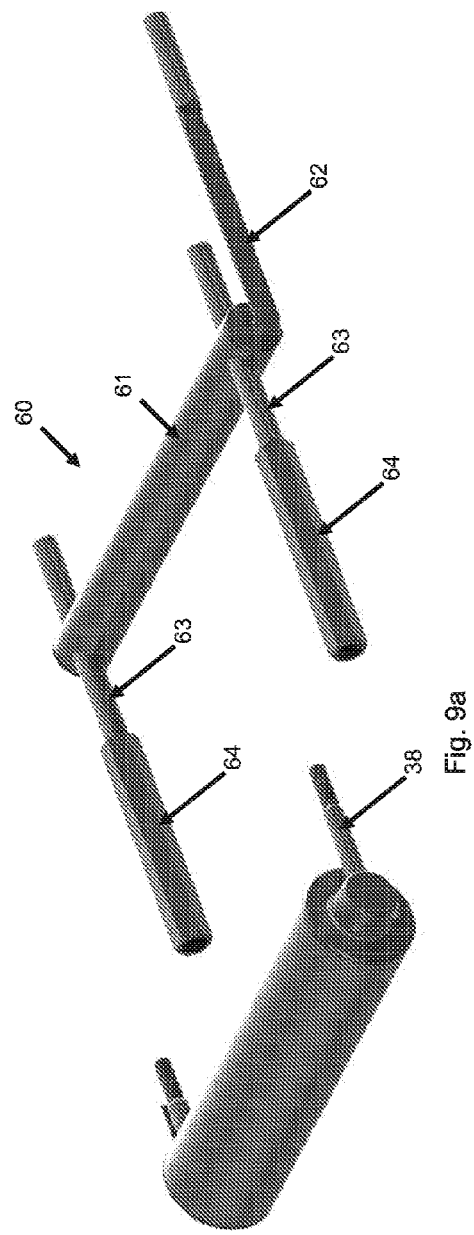
FIGS. 9-10 show a quick release system according to an embodiment of the invention, FIG. 11 show cross-sectional illustrations of the quick release system, FIG. 12 show photos of the linear actuation of the quick release system.
Figure 9B:
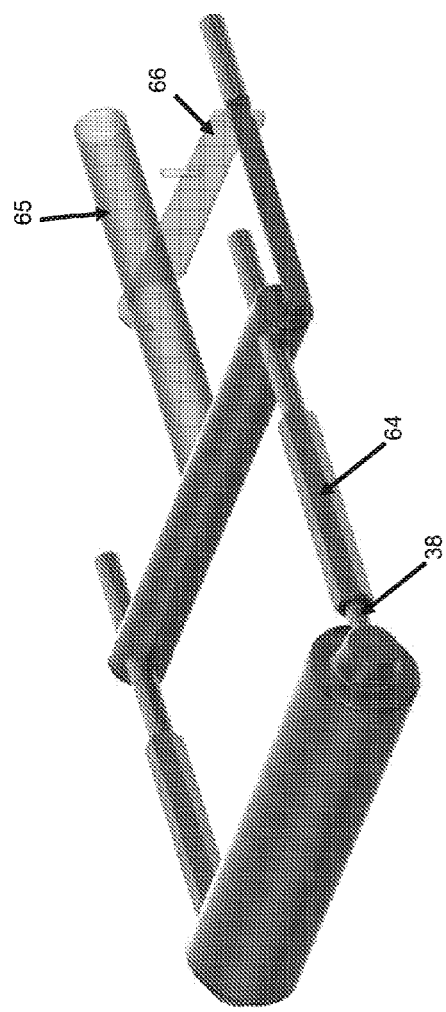

In one embodiment of the invention each linear actuator is incorporated in an actuator tube 63. I.e. the sensible moving parts of the actuator may be enclosed in a tube 63 and thereby isolated from the surroundings. The actuator tubes 63 may e.g. traverse the pivot tube 61, as shown in the figures. Belt tensioners 64 may be provided to directly attach to a threaded support interface 38 on a drum motor, thereby connecting a drum motor to the quick release system 60, as shown in FIG. 9*b*. The outside of the belt tensioners 64, which preferably are rotatable, may be shaped as hex nuts to provide for easy adjustment of the belt tension with an appropriate tool. In FIG. 9*b* it is also illustrated how the quick release system 60 can be attached to a conveyor frame 65, e.g. by welding the pivot tube 61 to the conveyor frame 65. A handle support 66 may be provided on the conveyor frame to support the release handle 62. The handle support may be provided with an opening with opposed projections as a safety precaution such that the release handle must be lifted out of the opening. This is illustrated more clearly in FIGS. 10*a* and 10*b*.

In one embodiment of the invention each linear actuator is a rack 67 and pinion 68 type, as illustrated in FIG. 11*b*. The pinions 68 are located on the pivot axis 70 extending through the pivot axis tube 61. As seen from FIG. 11*b* the rack 67 can be linear displaced inside the actuator tube 63. In one embodiment of the invention the release handle 62 is adapted to be rotated between 0 and 90 degrees, such as between 0 and 180 degrees, preferably between 0 and 360 degrees. This is depending on the configuration of the rack and pinion. In the example illustrated in FIG. 11*b*, with the length and teeth of the rack 67 and the diameter and teeth of the pinion 68, a 360 degrees rotation of the pinion (and thereby the release handle 62) corresponds to a full travel of the rack 67, which in the illustrated case corresponds to a linear displacement of approx. 100 mm.

Figure 12A:
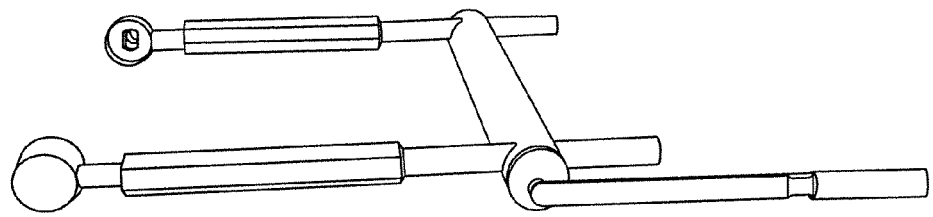
Figure 12B:
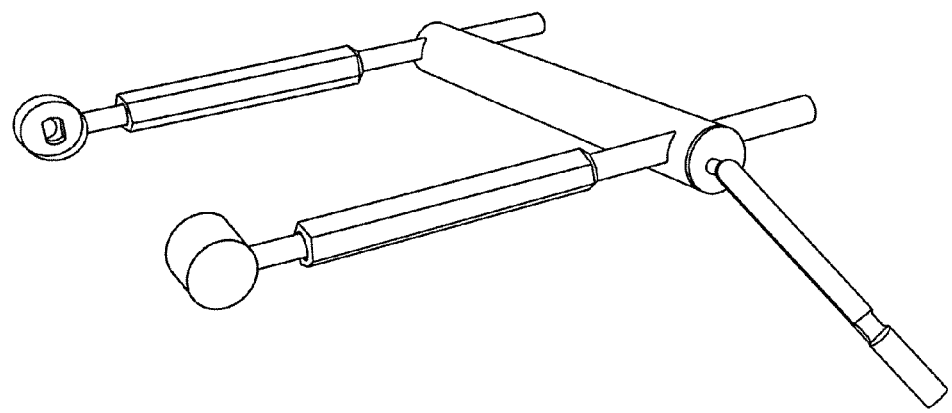
Figure 12C:
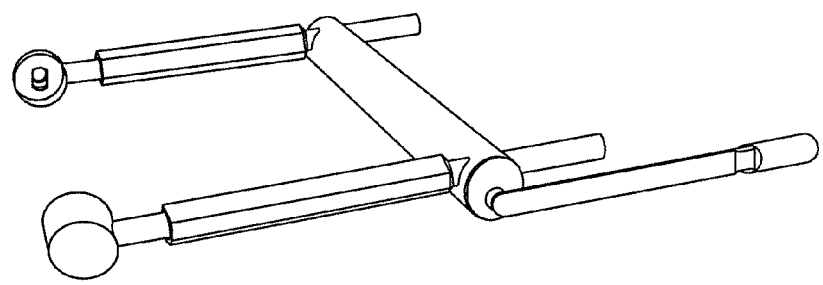

The functionality of the quick release is illustrated in FIG. 12 showing photos of the quick release system 61 lying freely on a table. In FIG. 12 the release handle is in position 0 degrees. Upon rotation as seen in FIG. 12*b* the belt tensioners 64 approaches the pivot tube 61 because the rack and pinion linear actuator is engaged inside the pivot tube 61 when the release handle 62 is rotated. In FIG. 12 the release handle has been rotated a full round, i.e. 360 degrees and the belt tensioner is now very close to the pivot tube 61.

Figure 10C:
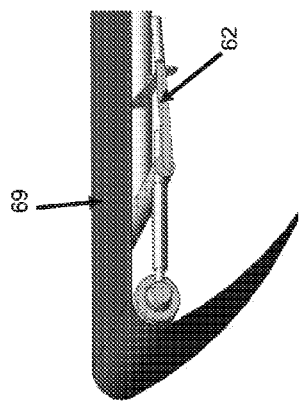
Figure 10A:
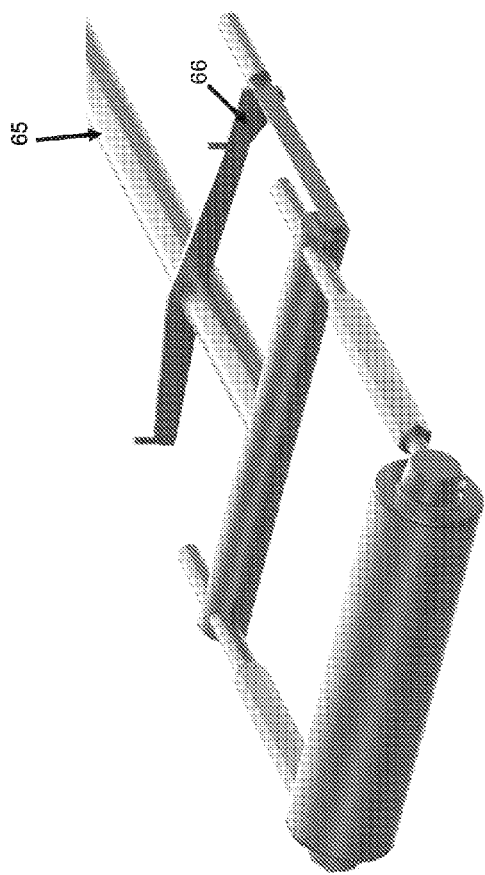
Figure 10B:
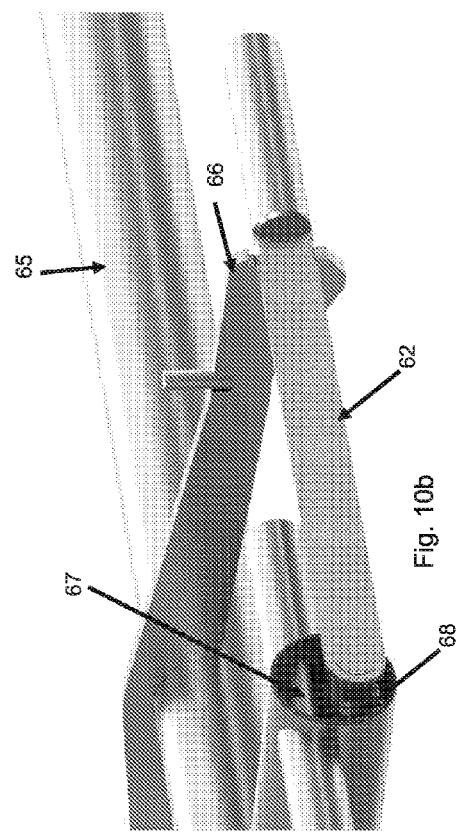

In one embodiment the release handle is adapted to be locked in relation to the conveyor frame, preferably the release handle is adapted to be locked in relation to the conveyor frame in two pivot axis positions. In FIGS. 9*b* and 10 the release handle can be locked in a position where it is substantially parallel with the actuator tubes, i.e. in position 0 degrees. The release handle can rotate a full round and be locked again in position 360 degrees. The quick release system may therefore be configured such that when integrated in a conveyor belt system, the endless belt is slack and taught, respectively, in said two pivot axis positions.

Figure 14:
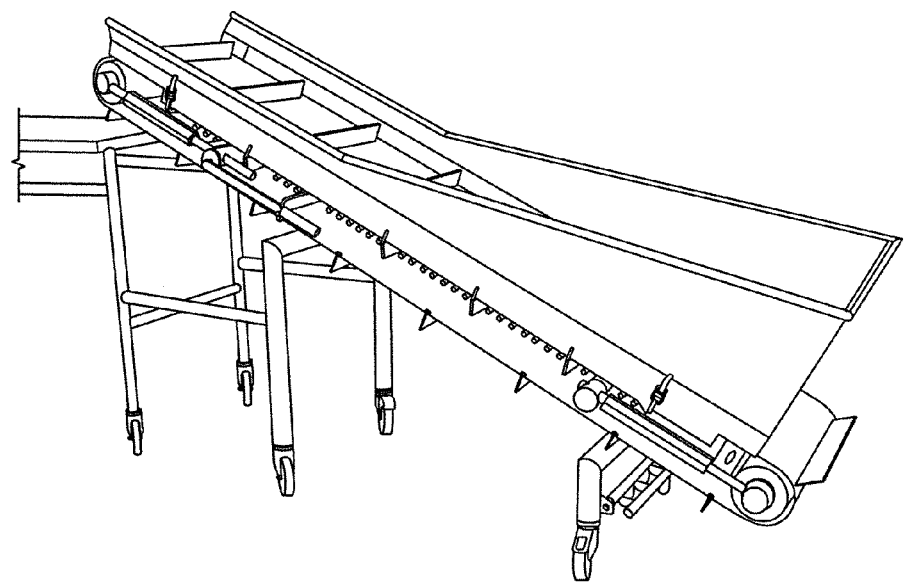
FIG. 14 is a photo of a conveyor system with the quick release system

An integration of the quick release system into a conveyor system is shown in FIGS. 13 and 14. FIG. 13 is an illustration of a conveyor belt system where the drum motor in the end drives the conveyor belt 69. The drum motor is attached to the conveyor frame via the quick release system where the release handle 62, the actuator tube 63, the pivot tube 61 and the belt tensioner 64 are visible. In the shown configuration the conveyor belt 69 is taught and the tightness has been adjusted by means of the belt tensioners. When rotating the belt tensioners 64 the drum motor is displaced whereby the tension of the conveyor belt 69 can be adjusted. If the belt must be disassembled or the conveyor belt system needs cleaning the release handle 62 can be released and rotated a full 360 degrees and put back into place along the conveyor frame. The quick release system has now displaced the drum motor towards the pivot tube 61 whereby the conveyor belt becomes slack. When service is completed the release handle is rotated 360 degrees in the opposite direction and the tension of the conveyor belt system is restored.

Further Details of the Invention

The invention will now be described in further detail with reference to the following items:

1. A drum motor comprising a drum shell accommodating a geared rim secured to the drum shell, a first inner end cap attached to the geared rim, a second inner end cap attached to a locking flange having an expanding element adapted to secure the second inner end cap to the drum shell when attaching the second inner end cap to the locking flange.
2. The drum motor according to any of the preceding items, wherein the locking flange comprises a tapered or conical part for accommodating the expanding element.
3. The drum motor according to any of the preceding items, wherein the expanding element is adapted to expand radially towards the drum shell when the second inner end cap is being attached to the locking flange.
4. The drum motor according to any of the preceding items, wherein the second inner end cap is detachably mounted on the locking flange by means of a plurality of axially mounted attachment means, such as bolts, provided with seals, such as static oil seals, such as Usit rings.
5. The drum motor according to any of the preceding items, wherein the locking flange is adapted to be displaced axially towards the second inner end cap, when the second inner end cap is being tightened against the locking flange.
6. The drum motor according to any of the preceding items, wherein the second inner end cap and the locking flange are adapted to be loosely attached to each other outside the drum motor without activating the expanding element and subsequently be inserted into the drum motor as essentially one unit.
7. The drum motor according to any of the preceding items, further comprising outer end caps attached to the ends of the drum shell for covering and sealing the interior of the drum shell.
8. The drum motor according to item 7, wherein the outer end caps are detachably press fitted and/or snap fitted into the inner end caps or the drum shell.
9. The drum motor according to any of the preceding items 7 to 8, wherein the outer end caps are provided with a rotary lip seal.
10. The drum motor according to any of the preceding items, further comprising first and second stationary shafts traversing each end of the drum shell, support cups attached to the stationary shafts and outer end caps attached to the inner end caps or the drum shell and sealing against the support cups, wherein each support cup comprises a support interface adapted for attachment to a conveyor frame.
11. The drum motor according to any of the preceding items 7 to 10, wherein the outer end caps are detachably mounted on the inner end caps or on the drum shell.
12. The drum motor according to any of the preceding items, wherein the inner end caps are sealed against the drum shell.
13. The drum motor according to any of the preceding items, wherein the first inner end cap is detachably mounted on the geared rim, preferably axially mounted.
14. The drum motor according to any of the preceding items, wherein the first inner end cap is detachably mounted on the geared rim by means of a plurality of axially mounted attachment means, such as bolts, provided with seals, such as static oil seals, such as Usit rings.
15. The drum motor according to any of the preceding items, wherein the inside of the drum shell is provided with a projection, such as a conical projection, adapted to match and axially sustain the expanding element when the expanding element is in its at least partly expanded condition.
16. The drum motor according to any of the preceding items, wherein the expanding element is a spring ring or snap ring.
17. The drum motor according to any of the preceding items, wherein the first inner end cap is only attached to the geared rim.
18. The drum motor according to any of the preceding items, further comprising first and second stationary shafts traversing each end of the drum shell.
19. The drum motor according to item 18, wherein the stationary shafts are located in line along a longitudinal central axis of the drum and wherein the drum shell is adapted to rotate around said stationary shafts.
20. The drum motor according to any of the preceding items, further comprising a motor secured to the stationary shafts.
21. The drum motor according to any of the preceding items, further comprising a gear engaging the motor and the geared rim.
22. The drum motor according to any of the preceding items, wherein the geared rim is secured to the drum shell.
23. The drum motor according to any of the preceding items, wherein the geared rim is adapted to transfer the torque from the motor to the drum shell.
24. A drum motor comprising a drum shell and first and second stationary shafts traversing each end of the drum shell, the drum shell accommodating a geared rim secured to the drum shell, a first inner end cap attached to the geared rim, a second inner end cap secured against the drum shell, support cups attached to the stationary shafts and outer end caps attached to the inner end caps or the drum shell and sealing against the support cups.
25. The drum motor according to item 24, wherein the support cups are adapted for direct integration with a conveyor frame.
26. The drum motor according to any of the preceding items, wherein the support cups are adapted such that the axial position of the support cups relative to the stationary shafts may be adjusted.
27. The drum motor according to any of the preceding items, wherein each support cup comprises a support interface, such as a support interface for attachment to a conveyor frame.

28. The drum motor according to any of the preceding items, wherein the support cups are attached to the stationary shaft by means of a fastener, such as a bolt.
29. The drum motor according to any of the preceding items, wherein the support cups are adapted for fitting or snap fitting of the drum motor directly into a conveyor frame.
30. The drum motor according to any of the preceding items, wherein the support cups and/or the support interfaces are adapted for direct attachment to a belt tensioning mechanism on a conveyor frame.
31. The drum motor according to any of the preceding items, wherein a safety shield is attached to the support cups and/or the support interface, the safety shield adapted to at least partly cover the gaps between the conveyor belt and the drum shell.
32. The drum motor according to any of the preceding items 1 to 23, further comprising any of the features of the drum motor according to any of items 24 to 31.
33. The drum motor according to any of items 24 to 31, further comprising any of the features of the drum motor according to any of items 1 to 23.
34. A quick release system for an endless belt conveyor system comprising an elongated release handle in rotatable engagement with a pivot axis incorporated in a pivot tube, each end of the pivot tube attached to a linear actuator extending perpendicular to the pivot tube, wherein
    the tube is adapted to be attached to a conveyor frame such that the pivot tube extends across the conveyor belt,
    the linear actuators are adapted to be attached to a conveyor roll such that the rotation axis of the conveyor roll and the pivot axis are parallel, and
    the quick release system is configured such that rotation of the elongated release handle around the pivot axis engages the linear actuators.
35. The quick release system according to item 34, wherein each linear actuator is incorporated in an actuator tube.
36. The quick release system according to any of preceding items, wherein each linear actuator is a rack and pinion type.
37. The quick release system according to any of preceding items, wherein the release handle is adapted to be locked in relation to the conveyor frame.
38. The quick release system according to any of preceding items, wherein the release handle is adapted to be locked in relation to the conveyor frame in two pivot axis positions.
39. The quick release system according to any of preceding items, wherein the endless belt is slack and taught, respectively, in said two pivot axis positions.
40. The quick release system according to any of preceding items, wherein said two pivot axis positions are separated by 360 degrees of release handle rotation.
41. The quick release system according to any of preceding items, wherein the longitudinal axis of the release handle is substantially parallel to the linear actuators in said two pivot axis positions.
42. The quick release system according to any of preceding items, wherein rotation of the release handle between said two pivot axis positions corresponds to a linear displacement of approx. 100 mm of the linear actuators.
43. The quick release system according to any of preceding items, wherein the release handle is adapted to be rotated between 0 and 90 degrees, such as between 0 and 180 degrees, preferably between 0 and 360 degrees.
44. The quick release system according to any of preceding items, wherein the actuator tubes traverse the pivot tube.
45. The quick release system according to any of preceding items, wherein the conveyor roll is attached to the linear actuators by means of belt tensioning mechanisms.
46. The quick release system according to any of preceding items, wherein each tensioning mechanism comprises a hex nut for varying the tension of the conveyor belt.
47. The quick release system according to any of items 34 to 46, wherein the conveyor roll is the drum motor according to any of items 1 to 33.

The invention claimed is:

1. A drum motor comprising a drum shell accommodating a geared rim secured to the drum shell, a first inner end cap attached to the geared rim, a second inner end cap attached to a locking flange having an expanding element adapted to secure the second inner end cap to the drum shell when attaching the second inner end cap to the locking flange, wherein the locking flange is adapted to be displaced axially towards the second inner end cap when the second inner end cap is being tightened against the locking flange.

2. The drum motor according to claim 1, wherein the locking flange comprises a tapered or conical part for accommodating the expanding element.

3. The drum motor according to claim 1, wherein the expanding element is adapted to expand radially towards the drum shell when the second inner end cap is being attached to the locking flange.

4. The drum motor according to claim 1, wherein the second inner end cap is detachably mounted on the locking flange by means of a plurality of axially mounted attachment means provided with seals.

5. The drum motor according to claim 1, wherein the second inner end cap and the locking flange are adapted to be loosely attached to each other outside the drum motor without activating the expanding element and subsequently be inserted into the drum motor as essentially one unit.

6. The drum motor according to claim 1, further comprising outer end caps attached to the ends of the drum shell for covering and sealing the interior of the drum shell.

7. The drum motor according to claim 6, wherein the outer end caps are detachably press fitted or snap fitted into the inner end caps or the drum shell.

8. The drum motor according to claim 6, wherein the outer end caps are provided with a rotary lip seal.

9. The drum motor according to claim 1, further comprising first and second stationary shafts traversing each end of the drum shell, support cups attached to the stationary shafts and outer end caps attached to the inner end caps or the drum shell and sealing against the support cups, wherein each support cup comprises a support interface adapted for attachment to a conveyor frame.

10. A drum motor for a conveyor belt comprising a drum shell and first and second stationary shafts traversing each end of the drum shell, the drum shell accommodating a geared rim secured to the drum shell, a first inner end cap attached to the geared rim, a second inner end cap secured against the drum shell, support cups attached to the stationary shafts and outer end caps attached to the inner end caps or the drum shell and sealing against the support cups, each support cup comprising a support interface adapted for attachment to a conveyor frame, wherein a safety shield is attached to at least one of the support cups and the support interface, the safety shield adapted to at least partly cover the gaps between the conveyor belt and the drum shell.

11. The drum motor according to claim 10, wherein the support cups are adapted for direct integration with the conveyor frame.

12. The drum motor according to claim 10, wherein the support cups are adapted such that the axial position of the support cups relative to the stationary shafts can be adjusted.

13. The drum motor according to claim 10, wherein the support cups are attached to the stationary shaft by means of a fastener.

14. The drum motor according to claim 10, wherein the support cups are adapted for fitting or snap fitting of the drum motor directly into the conveyor frame.

15. The drum motor according to claim 10, wherein at least one of the support cups and the support interfaces is adapted for direct attachment to a belt tensioning mechanism on the conveyor frame.

16. The drum motor according to claim 4, wherein the seals are static oil seals.

\* \* \* \* \*